(12) United States Patent
Nakao

(10) Patent No.: US 12,203,836 B2
(45) Date of Patent: Jan. 21, 2025

(54) BUBBLE MEASUREMENT DEVICE AND BUBBLE MEASUREMENT METHOD

(71) Applicant: SUMITOMO METAL MINING CO., LTD., Tokyo (JP)

(72) Inventor: Yoshihiko Nakao, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 190 days.

(21) Appl. No.: 18/186,586

(22) Filed: Mar. 20, 2023

(65) Prior Publication Data

US 2023/0228663 A1 Jul. 20, 2023

Related U.S. Application Data

(63) Continuation of application No. PCT/JP2021/038746, filed on Oct. 20, 2021.

(30) Foreign Application Priority Data

Nov. 6, 2020 (JP) .................................. 2020-185831

(51) Int. Cl.
*G01N 15/0227* (2024.01)
*G01N 15/00* (2024.01)

(52) U.S. Cl.
CPC . *G01N 15/0227* (2013.01); *G01N 2015/0011* (2013.01)

(58) Field of Classification Search
CPC ....... G01N 15/0227; G01N 2015/0011; G01N 15/1433; G01N 2015/1486; G01N 2015/1493; G01N 15/1459

(Continued)

(56) References Cited

U.S. PATENT DOCUMENTS 5,644,388 A 7/1997 Maekawa et al.
8,293,524 B2 * 10/2012 Ionescu-Zanetti ..........................
B01L 3/502738
435/395

(Continued)

FOREIGN PATENT DOCUMENTS

CN 104596898 5/2015
JP H07-286953 10/1995

(Continued)

OTHER PUBLICATIONS

International Search Report mailed on Jan. 11, 2022 with respect to PCT/JP2021/038746.

*Primary Examiner* — Seung C Sohn
(74) *Attorney, Agent, or Firm* — IPUSA, PLLC

(57) ABSTRACT

A bubble measurement device for measurement of bubbles moving in a liquid includes a measurement chamber having an image capturing surface; an image capturing device that captures an image of the bubbles passing along the image capturing surface; an introduction pipe that introduces the bubbles into the measurement chamber; a retaining tank that stores the liquid; a supply pump that draws up the liquid; a drain pipe that returns the liquid into the retaining tank; and a flow velocity adjusting mechanism that adjusts a flow velocity of the liquid passing along the image capturing surface. The flow velocity adjusting mechanism adjusts the flow velocity of the liquid passing along the image capturing surface to be within a range in which the bubbles are measurable. The range is obtained in advance in accordance with an image resolution and a shutter speed of the image capturing device.

6 Claims, 5 Drawing Sheets

(58) Field of Classification Search
USPC .......................................................... 356/335
See application file for complete search history.

(56) References Cited

U.S. PATENT DOCUMENTS

| | | | |
|---|---|---|---|
| 2013/0269416 A1* | 10/2013 | Myrick | G01N 29/02 |
| | | | 73/19.03 |
| 2020/0376448 A1 | 12/2020 | Ohuchi et al. | |
| 2021/0348999 A1 | 11/2021 | Kato et al. | |

FOREIGN PATENT DOCUMENTS

| | | |
|---|---|---|
| JP | 2011-179899 | 9/2011 |
| JP | 2018-004450 | 1/2018 |
| JP | 2020-056743 | 4/2020 |
| WO | 2019/181765 | 9/2019 |
| WO | 2020/132768 | 7/2020 |

\* cited by examiner

BUBBLE MEASUREMENT DEVICE AND BUBBLE MEASUREMENT METHOD

CROSS-REFERENCE TO RELATED APPLICATIONS

This application is a continuation of International Application No. PCT/JP2021/038746, filed on Oct. 20, 2021 and designating the U.S., which claims priority to Japanese Patent Application No. 2020-185831, filed on Nov. 6, 2020. The contents of these applications are incorporated herein by reference in their entirety.

BACKGROUND OF THE INVENTION

1. Field of the Invention

The disclosure herein relates to a bubble measurement device and a bubble measurement method.

2. Description of the Related Art

In flotation, contact between mineral particles and bubbles in ore slurry is an important mechanism. With respect to the contact probability, the diameters of bubbles are known to be important factors, and attempts have been made to determine the diameters of bubbles. In particular, fine bubbles having a bubble diameter of 1 to 100 μm are called microbubbles and are expected to have potential applications. However, the buoyancy of such fine bubbles is very small, and in a conventional bubble measurement device, it is difficult to introduce fine bubbles into an imaging cell, which is an area where the bubbles are measured.

As a method for dealing with the above problem, for example, a method in Patent Document 1 is disclosed. The method in Patent Document 1 is a method for delivering a liquid containing bubbles to be measured to an image capturing unit, which captures an image of the bubbles to be measured, and a light intensity measurement unit, which irradiates the bubbles with laser light to acquire light intensity distribution data indicating the intensity distribution of diffracted/scattered light, and measuring the particle size distribution of a bubble group based on image information acquired from the image capturing unit and the light intensity distribution data acquired from the light intensity measurement unit. With this method, the liquid is delivered by operating a pump that is connected to the image capturing unit and to the light intensity measurement unit. By performing such a method, the particle size distribution of a bubble group can be measured.

In addition to bubbles to be measured, foreign matter is also contained in a liquid. In the method described in Patent Document 1, bubbles to be measured and foreign matter other than the bubbles are identified based on image information acquired from the image capturing unit. Specifically, a mechanical method is used in which an image having a spherical shape is determined as a bubble and an image having a flat shape is determined as foreign matter. In order to make such a determination appropriately, an image needs to be captured clearly enough to make a determination appropriately. If an image of a captured bubble is blurred, the image of the captured bubble may be a flat shape image and may be determined as foreign matter. Therefore, a determination cannot be made appropriately.

However, a method for capturing a sharp image is not disclosed in the method in Patent Document 1.

RELATED-ART DOCUMENTS

Patent Documents

Patent Document 1: Japanese Laid-open Patent Publication No. 2018-4450

SUMMARY OF THE INVENTION

It is desirable to provide a bubble measurement device and a bubble measurement method in which a sharp image of fine bubbles can be captured and the fine bubbles can be measured.

According to an embodiment of the present disclosure, a bubble measurement device for measurement of bubbles moving in a liquid is provided. The bubble measurement device includes a measurement chamber, an image capturing device, an introduction pipe, a retaining tank, a supply pump, a drain pipe, and a flow velocity adjusting mechanism. The liquid containing the bubbles to be measured is introduced into the measurement chamber from below the measurement chamber, and the measurement chamber has an image capturing surface at a position where the introduced bubbles rise. The image capturing device is configured to capture an image of the bubbles passing along the image capturing surface. The introduction pipe is provided below the measurement chamber and is configured to introduce the bubbles into the measurement chamber. The retaining tank is configured to store the liquid containing the bubbles to be introduced into the measurement chamber by the introduction pipe. The supply pump is provided above the measurement chamber and is configured to draw up the liquid containing the bubbles so as to supply the liquid into the measurement chamber. The drain pipe is configured to return the liquid into the retaining tank after the liquid passes through the measurement chamber and the bubbles are measured. The flow velocity adjusting mechanism is configured to adjust a flow velocity of the liquid passing along the image capturing surface. The flow velocity adjusting mechanism adjusts the flow velocity of the liquid passing along the image capturing surface to be within a range in which the bubbles are measurable. The range is obtained in advance in accordance with an image resolution and a shutter speed of the image capturing device.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, embodiments of the present invention will be described with reference to the drawings.

Figure 1:
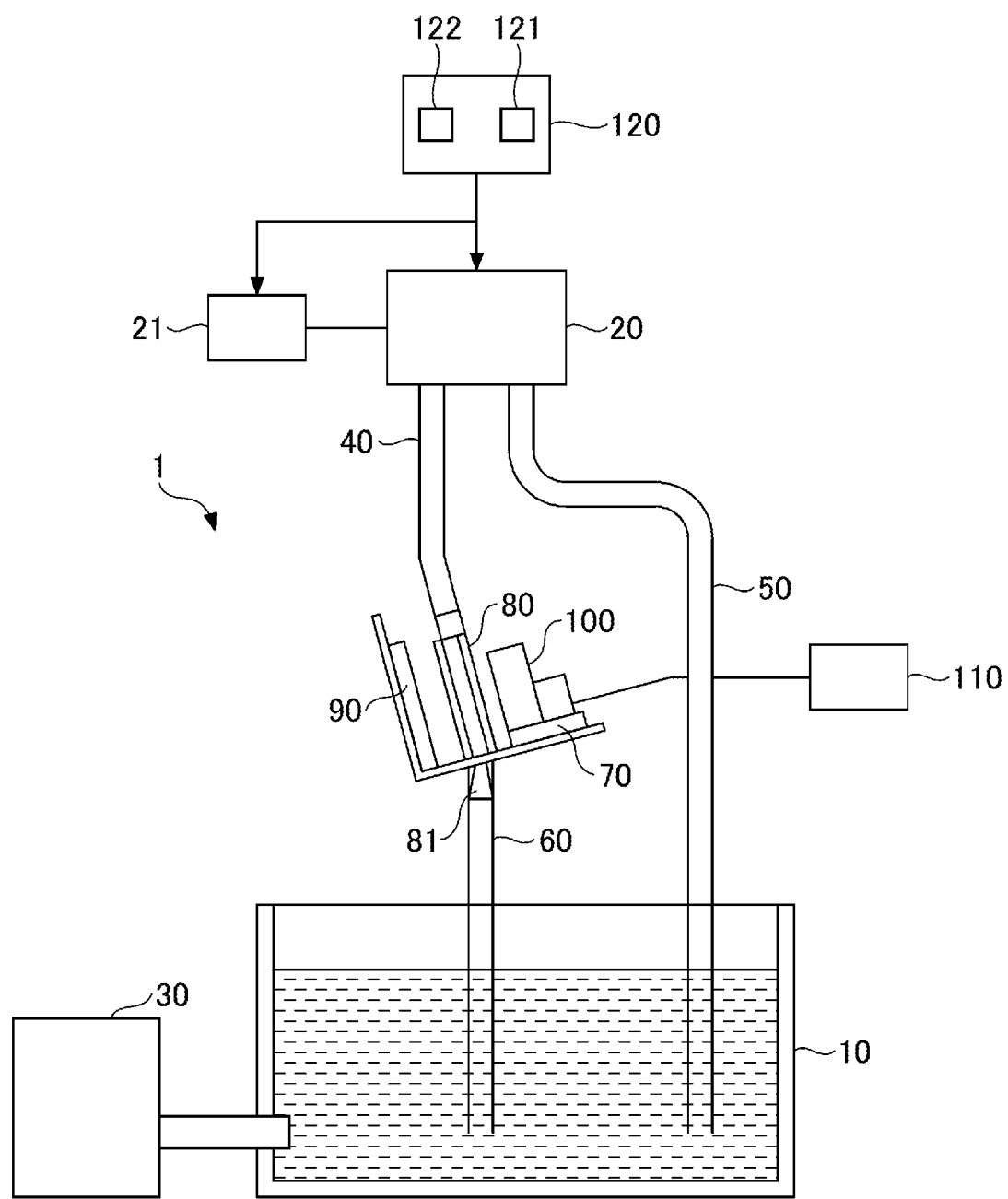
FIG. 1 is a schematic diagram illustrating a device configuration of a bubble measurement device according to an embodiment.

FIG. 1 is a schematic diagram illustrating a configuration of a bubble measurement device according to an embodiment. A bubble measurement device 1 according to an embodiment includes an introduction pipe 60, a frame 70, a measurement chamber 80, an introduction pipe connector 81, a light projection device 90, an image capturing device 100, an image processor 110, a controller 120, a supply pump 20, a flow velocity adjusting mechanism 21, a delivery pipe 40, and a drain pipe 50. The introduction pipe 60 is immersed in a liquid retained in a retaining tank 10.

The introduction pipe 60 is connected to the lower side of the measurement chamber 80 via the introduction pipe connector 81, and is configured to deliver the liquid to the measurement chamber 80. One surface (surface facing upward) of the measurement chamber 80 serves as an image capturing surface, and the image capturing device 100 is disposed facing the image capturing surface. The light projection device 90 is disposed facing the other surface (surface facing downward) of the measurement chamber 80. The delivery pipe 40 is connected to the upper end of the measurement chamber 80, and the supply pump 20 is connected to the upper end of the delivery pipe 40. The drain pipe 50 is connected to the lower surface of the supply pump 20, and the lower end of the drain pipe 50 is immersed in the liquid in the retaining tank 10. Further, the flow velocity adjusting mechanism 21 is connected to the supply pump 20.

A bubble generating device 30 configured to generate bubbles in the liquid is connected to the retaining tank 10. For example, in a case where the bubble generating device 30 generates bubbles (hereinafter also referred to as "microbubbles") having a bubble diameter of 1 µm to 100 µm in the liquid, the bubble measurement device 1 according to the present embodiment can capture a sharp image of the bubbles. Then, based on the captured image, the bubble measurement device 1 according to the present embodiment can measure the bubbles, that is, the bubble diameters, the bubble size distribution (the particle size distribution of a bubble group), and the like.

In the present embodiment, capturing an image of bubbles including microbubbles and measuring the bubbles are performed by the following steps.

First, bubbles including microbubbles are generated, by the bubble generating device 30, in a liquid retained in the retaining tank 10, and in this state, the liquid containing the bubbles is introduced into the measurement chamber 80 through the introduction pipe 60 by operating the supply pump 20 of the bubble measurement device 1. At this time, the flow velocity adjusting mechanism 21 adjusts the flow velocity of the liquid passing along the image capturing surface in the measurement chamber 80 to be within a range in which a sharp image of the bubbles including the microbubbles can be captured (step 1). Details of the adjustment of the flow velocity by the flow velocity adjusting mechanism 21 will be described later.

Next, the light projection device 90 irradiates a surface opposite to the image capturing surface in the measurement chamber 80 with light, and the image capturing device 100 is used to capture an image of the bubbles passing along the image capturing surface (step 2). Next, information necessary to measure the bubble diameters, the bubble size distribution, and the like of the bubbles contained in the liquid is obtained based on the captured image, and the bubble diameters, the bubble size distribution, and the like are measured (step 3). Next, components constituting the bubble measurement device 1 will be described below.

(Introduction Pipe)

In the present embodiment, the introduction pipe 60 is a pipe whose both ends are open. One end of the introduction pipe 60 is immersed in the liquid retained in the retaining tank 10, and the other end of the introduction pipe 60 is connected to the introduction pipe connector 81. In the present embodiment, in order to introduce bubbles into the measurement chamber 80 through the introduction tube 60, not only the buoyancy of bubbles, but also power generated by operating the supply pump 20, which will be described later, is utilized.

(Measurement Chamber)

In the present embodiment, the measurement chamber 80 is comprised of a plurality of transparent members. In the present embodiment, the material of the transparent members is vinyl chloride. As the material of the transparent members, a material having high light transmittance may be suitably used so that light emitted from the light projection device 90 can be transmitted through the measurement chamber 80 and measured by the image capturing device 100. In the visible light range of 400 nm to 700 nm, the light transmittance of each of the members is preferably 80% or more, and more preferably 90% or more.

As a material satisfying the above-described optical properties, glass, acrylic, polyethylene terephthalate (PET), polycarbonate, or the like may be used in addition to vinyl chloride.

Vinyl chloride is inexpensive, is easy to process, and has high transparency. Therefore, vinyl chloride can be suitably used as a material of the measurement chamber 80. In addition, acrylic has higher transparency than vinyl chloride, is less scratchy, and is unlikely to decrease in transparency, and thus, acrylic can be suitably used for installation in places where replacement is difficult.

Figure 2A:
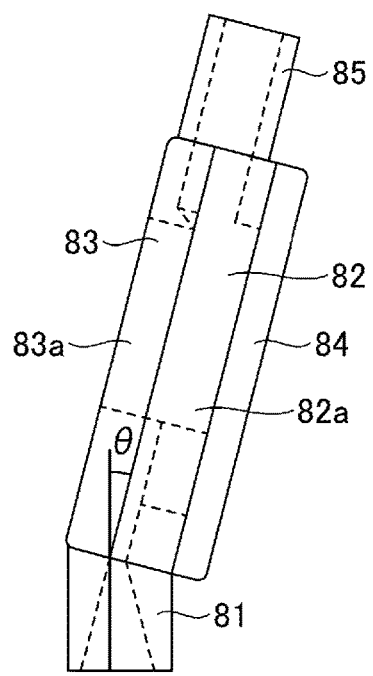
FIG. 2A and FIG. 2B are detailed views of a measurement chamber.
Figure 2B:
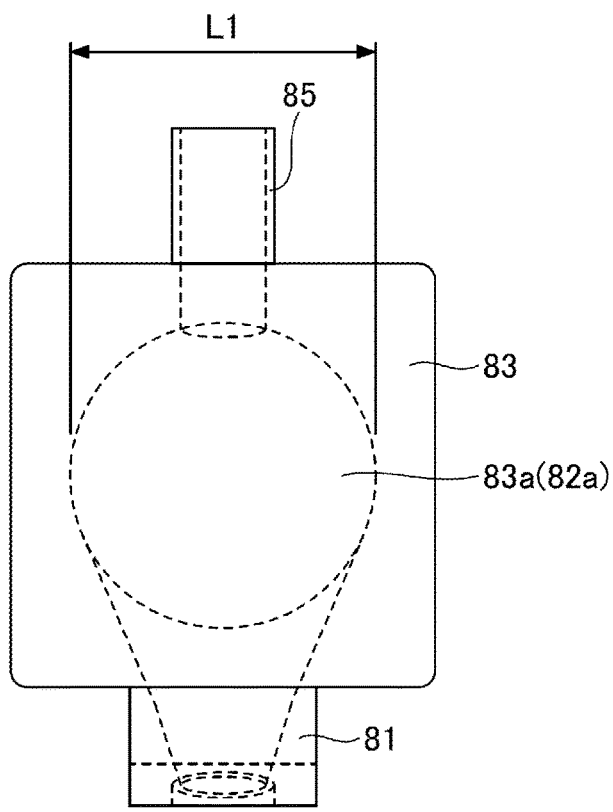

As illustrated in FIG. 2A and FIG. 2B, the measurement chamber 80 includes a main member 82, a first cover member 83, and a second cover member 84. The first cover member 83 and the second cover member 84 are provided so as to sandwich the main member 82. The contour of the main member 82 is in the form of a thick square plate, that is, a flat quadrangular prism. The main member 82 is provided with a measurement hole 82a having a relatively large diameter. The axial direction of the measurement hole 82a coincides with the thickness direction (this direction may be referred to as the thickness direction of the main member 82) of the thinnest quadrangular prism shape of the main member 82. When the main member 82 is sandwiched between the first cover member 83 and the second cover member 84 so as to block the measurement hole 82a, the measurement hole 82a becomes a space closed in the axial direction of the measurement hole 82a.

In the space defined by the main member 82, the first cover member 83, and the second cover member 84, the right side surface of the first cover member 83 is referred to as a transparent inclined surface, and a portion of the transparent inclined surface where the measurement hole 82a is positioned is referred to as a measurement portion 83a. In the present embodiment, the transparent inclined surface corresponds to the image capturing surface.

The measurement chamber 80 further includes the introduction pipe connector 81 provided on the lower side of the main member 82 and a delivery pipe connector 85 provided on the upper side of the main member 82. The introduction pipe 60 is connected to the measurement chamber 80 via the introduction pipe connector 81. The introduction pipe connector 81 has a through-hole, and both the introduction pipe connector 81 and the delivery pipe connector 85 have tubular structures, so that the measurement chamber 80 communicates vertically through these members. Such communication allows the liquid to pass along the image capturing surface and also allows bubbles in the liquid to be introduced from the introduction pipe 60.

The upper surface of the introduction pipe connector 81 is inclined at an inclination angle θ with respect to the horizontal plane. Because of the inclination of the upper surface of the introduction pipe connector 81, when the measurement chamber 80 is disposed such that the axis of the introduction pipe connector 81 is in the vertical direction, the transparent inclined surface including the measurement portion 83a is inclined at the inclination angle θ with respect to the vertical. That is, a normal line to the transparent inclined surface faces downward, and the transparent inclined surface is inclined downward. The inclination angle θ is determined so that the transparent inclined surface is positioned at a position where bubbles rise through the introduction port. In the present embodiment, the inclination angle θ is 15 degrees, but may be set to any angle depending on the application. By inclining the measurement portion 83a, it is possible to easily focus on all the bubbles when capturing an image of the bubbles.

The diameter L1 of the measurement hole 82a of the main member 82 constituting the bubble measurement device 1 according to the present embodiment is larger than the diameter of the inner surface of the introduction pipe 60. The diameter L1 of the measurement hole 82a is the length in the lateral direction of the measurement portion 83a when the transparent inclined surface is viewed from the front.

The main member 82 is provided with the measurement hole 82a as described above, and is also provided with an enlarged communication portion for communicating between the measurement hole 82a and the introduction pipe 60. The enlarged communication portion has a groove shape. The length in the lateral direction of the groove-shaped enlarged communication portion up to the measurement portion 83a is increased from the lower side to the upper side at a constant rate. The depth of the groove-shaped enlarged communication portion is one third of the length in the thickness direction of the main member 82.

(Light Projection Device)

In the present embodiment, the light projection device 90 emits light of a predetermined type from one surface of the measurement chamber 80 to the measurement portion 83a. This facilitates image capturing within the measurement chamber 80. For example, surface illumination such as a white LED is preferably used as an illumination device.

(Image Capturing Device)

In the present embodiment, the image capturing device 100 is preferably a digital camera or the like capable of capturing at least either a still image or a moving image. The size and quantity of bubbles captured by the image capturing device 100 are preferably analyzed by software that performs image processing. The image capturing device 100 may be any of a variety of image capturing devices as long as an image of bubbles can be appropriately captured. In the present embodiment, the image capturing device 100 has an image resolution capable of capturing an image of bubbles to be measured while recognizing the bubbles separately on a per-size basis.

As used herein, the "image resolution" is a value obtained by the following formula (1) and representing millimeters (mm) corresponding to one pixel of pixels (pixels) arranged in a grid in an imaging element of the image capturing device 100. For example, if the imaging field of view (Y-axis direction) is 100 mm, the image resolution of the image capturing device, in which the number of pixels in the Y-axis direction is 480, is 100 [mm]/480 pixels=0.208 [mm].

$$\text{Image resolution} = \text{imaging field of view (Y-axis direction) [mm]/number of pixels (Y-axis direction) of imaging element} \quad (1)$$

Figure 3A:
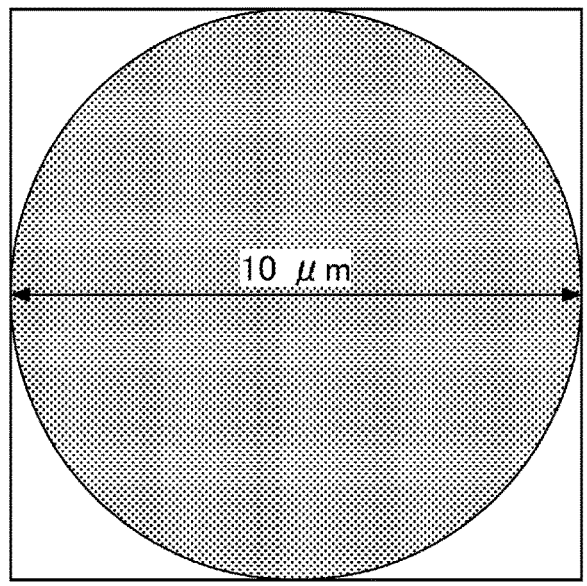
FIG. 3A is a drawing illustrating an example of image recognition when an image of a bubble having a bubble diameter of 10 μm is captured by an image capturing device having an image resolution of 10 μm.
Figure 3B:
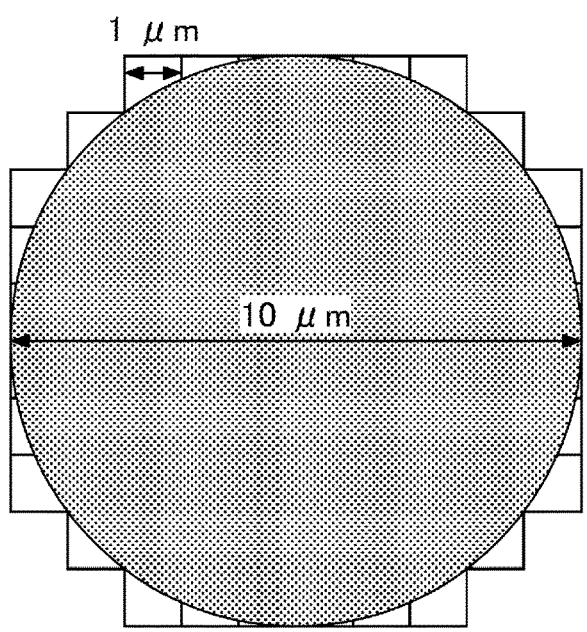
FIG. 3B is a drawing illustrating an example of image recognition when an image of the bubble having the bubble diameter of 10 μm is captured by an image capturing device having an image resolution of 1 μm.
Figure 3C:
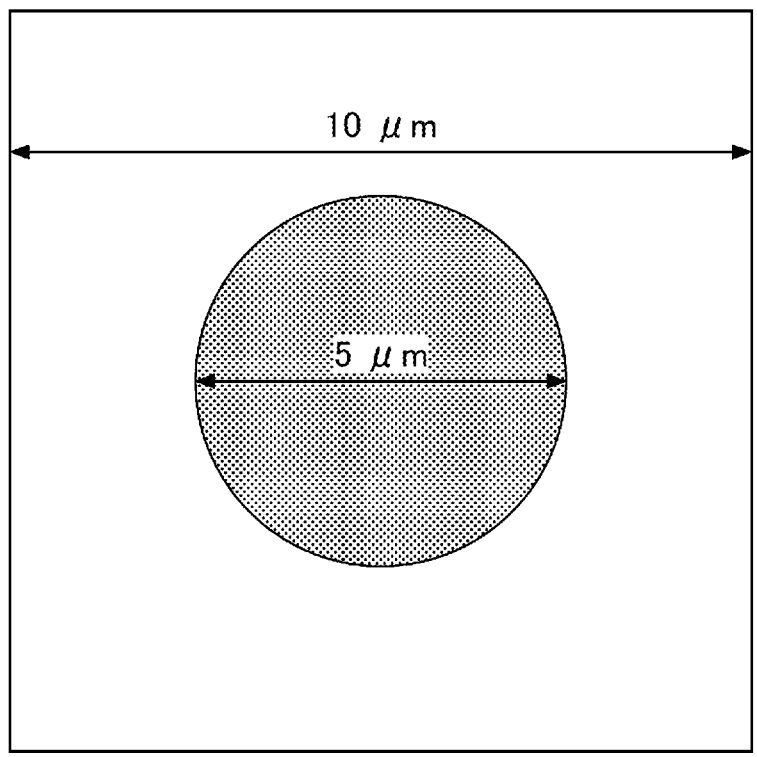
FIG. 3C is a drawing illustrating an example of image recognition when an image of a bubble having a bubble diameter of 5 µm is captured by the image capturing device having the image resolution of 10 µm.
Figure 3D:
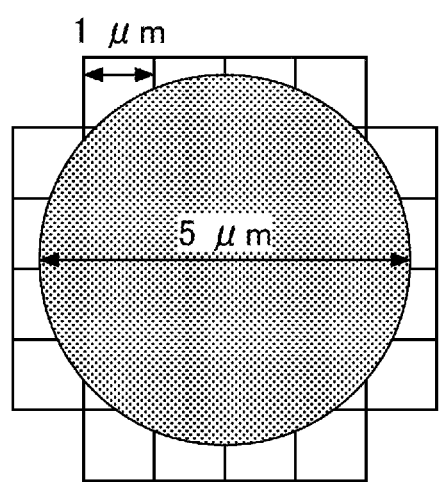
FIG. 3D is a drawing illustrating an example of image recognition when an image of the bubble having the bubble diameter of 5 µm is captured by the image capturing device having the image resolution of 1 µm.

FIG. 3A through FIG. 3D are drawings each illustrating the relationship between the image resolution of an image capturing device and the measurable size of a bubble. FIG. 3A is a drawing illustrating an example of image recognition when an image of a bubble having a bubble diameter of 10 μm is captured by an image capturing device having an image resolution of 10 μm. FIG. 3B is a drawing illustrating an example of image recognition when an image of the same bubble as that in FIG. 3A is captured by an image capturing device having an image resolution of 1 μm. FIG. 3C is a drawing illustrating an example of image recognition when an image of a bubble having a bubble diameter of 5 μm is captured by the image capturing device having the image resolution of 10 μm. FIG. 3D is a drawing illustrating an example of image recognition when an image of the same bubble as that in FIG. 3C is captured by the image capturing device having the image resolution of 1 μm.

As illustrated in FIG. 3A and FIG. 3C, with the image capturing device having the image resolution of 10 μm, the bubble having the bubble diameter of 10 μm and the bubble having the bubble diameter of 5 μm are each recognized as one pixel. That is, with the image capturing device having the image resolution of 10 μm, bubbles having a bubble diameter of 10 μm or less are each recognized as one pixel and thus cannot be recognized separately on a per-size basis. Conversely, as illustrated in FIGS. 3B and 3D, with the image capturing device having the image resolution of 1 μm, the bubble having the bubble diameter of 10 μm is recognized as 91 pixels and the bubble having the bubble diameter of 5 μm is recognized as 32 pixels. That is, with the image capturing device having the image resolution of 1 μm, bubbles can be recognized separately on a per-size basis. The smaller the value of the image resolution, the more it is possible to recognize small bubbles separately from large bubbles.

In the present embodiment, as described above, the image capturing device 100 has an image resolution capable of capturing an image of bubbles to be measured while recognizing the bubbles separately on a per-size basis. That is, the image capturing device 100 has an image resolution capable of recognizing the smallest bubble from among bubbles to be measured. In this example, bubbles including microbubbles having a bubble diameter of 1 to 100 μm are to be measured. Therefore, the image capturing device having an image resolution of 1 μm is used. Accordingly, bubbles of 1 μm or more can be recognized separately on a per-size basis. The image resolution of the image capturing device 100 is not required to be the same as the size of the smallest bubble from among the bubbles to be measured, as long as the image resolution is set to a smaller value. With this configuration, bubbles to be measured can be recognized separately on a per-size basis.

Conversely, if the image capturing device 100 does not have an image resolution capable of capturing an image of bubbles to be measured while recognizing the bubbles separately on a per-size basis, an image of the captured bubbles would not reflect the actual forms of the bubbles, and thus, it would not be desirable to measure the bubbles based on such an image.

In the present embodiment, the exposure time (shutter speed) of the image capturing device 100 is set to an exposure time necessary for images of captured bubbles to have sufficient brightness to measure the bubbles. The exposure time is preferably set to be as small as possible. Accordingly, it is possible to prevent the images of the captured bubbles from being blurred. In this example, the exposure time is set to $\frac{1}{2000}$ seconds.

(Supply Pump 20)

In the present embodiment, the supply pump 20 is a pump configured to draw up a liquid containing bubbles from the retaining tank 10 so as to supply the liquid into the measurement chamber 80. The supply pump 20 may be any of a variety of pumps as long as the liquid can be appropriately delivered. In this example, a tube pump that includes a liquid delivery roller therein is used as the supply pump 20. The delivery pipe 40, which will be described later, is connected to the suction side of the supply pump 20, and the drain pipe 50, which will be described later, is connected to the discharge side of the supply pump 20.

(Flow Velocity Adjusting Mechanism 21)

In the present embodiment, the flow velocity adjusting mechanism 21 is configured to adjust the velocity of flow generated by operating the supply pump 20. In this example, a drive device for driving the liquid delivery roller of the supply pump 20 is a brushless motor, and thus, an applied voltage control circuit for controlling the voltage applied to the brushless motor is used. By using the applied voltage control circuit to adjust the voltage applied to the brushless motor, the speed (rotational speed) of the brushless motor is adjusted, and as a result, the discharge amount of the liquid from the supply pump 20, that is, the flow velocity of the liquid passing along the image capturing surface of the measurement chamber 80 is adjusted.

Note that the flow velocity adjusting mechanism 21 can adjust the discharge amount of the liquid from the supply pump 20, that is, the flow velocity of the liquid passing along the image capturing surface of the measurement chamber 80 in any manner. More specifically, the type of the supply pump 20 is not particularly limited as long as the speed of the drive device can be controlled according to the type of the drive device for the supply pump 20. For example, if an AC motor is used as the drive device for the supply pump 20, the flow velocity adjusting mechanism 21 may be an inverter circuit that controls the drive frequency of the AC motor. If a servo motor is used as the drive device for the supply pump 20, the flow velocity adjusting mechanism 21 may be a driver circuit or the like that includes a speed controller for the servo motor. The flow velocity adjusting mechanism 21 is not required to be provided independently, and may be included in one of components of the supply pump 20, for example.

In the present embodiment, a flow velocity range of the liquid passing along the image capturing surface of the measurement chamber 80 is predetermined. That is, a flow velocity range in which bubbles can be appropriately measured is predetermined in accordance with the image resolution and the shutter speed of the image capturing device 100 to be used. Specifically, the bubble measurement device 1 according to the present embodiment is used to preliminarily investigate in what flow velocity range bubbles can be measured by the image capturing device 100. If the image resolution of the image capturing device 100 is small and the shutter speed of the image capturing device 100 is short as described above, a high flow velocity is set, and if the image resolution is large and the shutter speed is long, a low flow velocity is set. The flow velocity of the liquid is set so as to prevent bubbles from adhering to the image capturing surface and from coalescing. Such prevention can be accomplished by preparing a bubble generating device with a known bubble size distribution (a known particle size distribution of a bubble group), measuring a bubble size distribution generated by this bubble generating device, and comparing the measured bubble size distribution with the known bubble size distribution.

As described above, a flow velocity range in which bubbles can be measured is determined in accordance with the capabilities of the image capturing device 100. Therefore, flow velocities suitable for the image capturing device 100 to be used are preliminarily investigated. Then, suitable flow velocities are preliminarily set for the image capturing device 100 to be used, and in actual measurement of bubbles, the flow velocity of the liquid passing along the image capturing surface is set within a predetermined range or is set to be a predetermined value within the range. Accordingly, in actual measurement of bubbles, a flow velocity at which bubbles can be measured can be appropriately set, and thus, the bubbles can be measured clearly.

In this example, the flow velocity of the liquid passing along the image capturing surface of the measurement chamber 80 is set to 200 mm/second for the image capturing device 100 having an image resolution of 1 μm and an exposure time of $\frac{1}{2000}$ seconds; however, the flow velocity of the liquid passing along the image capturing surface of the measurement chamber 80 may be set in the range of 100 to 200 mm/second. Accordingly, adhesion of bubbles to the image capturing surface and coalescing of bubbles can be minimized, and thus, a sharp image of bubbles can be captured.

For measurement of bubbles, parameters, such as bubble diameters and a bubble size distribution, suitable for grasping the state of the bubbles are selected and used as indices for grasping the state of the bubbles.

(Controller)

The controller 120 is configured to control the supply pump 20 and the flow velocity adjusting mechanism 21, and may be a microprocessor that includes, for example, a central processing unit (CPU) 121 and a memory 122. In this case, a flow velocity range of a fluid suitable for the image capturing device 100 is stored in the memory 122 in advance, and the controller 120 may control the operation of each of the supply pump 20 and the flow velocity adjusting mechanism 21, such that the flow velocity of the fluid is within the suitable flow velocity range.

The controller 120 may also control the operation of each of the light projection device 90, the image capturing device 100, the image processor 110, the bubble generating device 30, and the like as necessary.

Note that the controller 120 is not necessarily required to be provided, and may be provided as necessary.

(Other Components)

In the present embodiment, one end of the delivery pipe 40 is connected to the delivery pipe connector 85 of the measurement chamber 80, and the other end of the delivery pipe 40 is connected to the suction side of the supply pump 20. The delivery pipe 40 is a pipe configured to deliver the liquid containing bubbles from the measurement chamber 80 to the supply pump 20.

One end of the drain pipe 50 is connected to the discharge side of the supply pump 20, and the other end of the drain pipe 50 is immersed in the liquid retained in the retaining tank 10. The drain pipe 50 is a pipe configured to deliver the liquid, which has been discharged from the supply pump 20, to the retaining tank 10.

The frame 70 is a support member configured to support the measurement chamber 80, the light projection device 90, and the image capturing device 100.

EXAMPLES

Example 1

After 18 liters (L) of fresh water was poured into the retaining tank, the bubble generating device connected to the retaining tank was operated to generate microbubbles in the fresh water.

Next, the bubble measurement device was prepared by setting the image resolution of the image capturing device to 1 μm and the exposure time (shutter speed) of the image capturing device to $1/2000$ seconds. Then, the introduction pipe was immersed in the fresh water and the tube pump was activated. At this time, the rotational speed of the roller of the tube pump was adjusted such that the flow velocity of the fresh water flowing along the image capturing surface of the measurement chamber was 200 mm/second.

Figure 4:
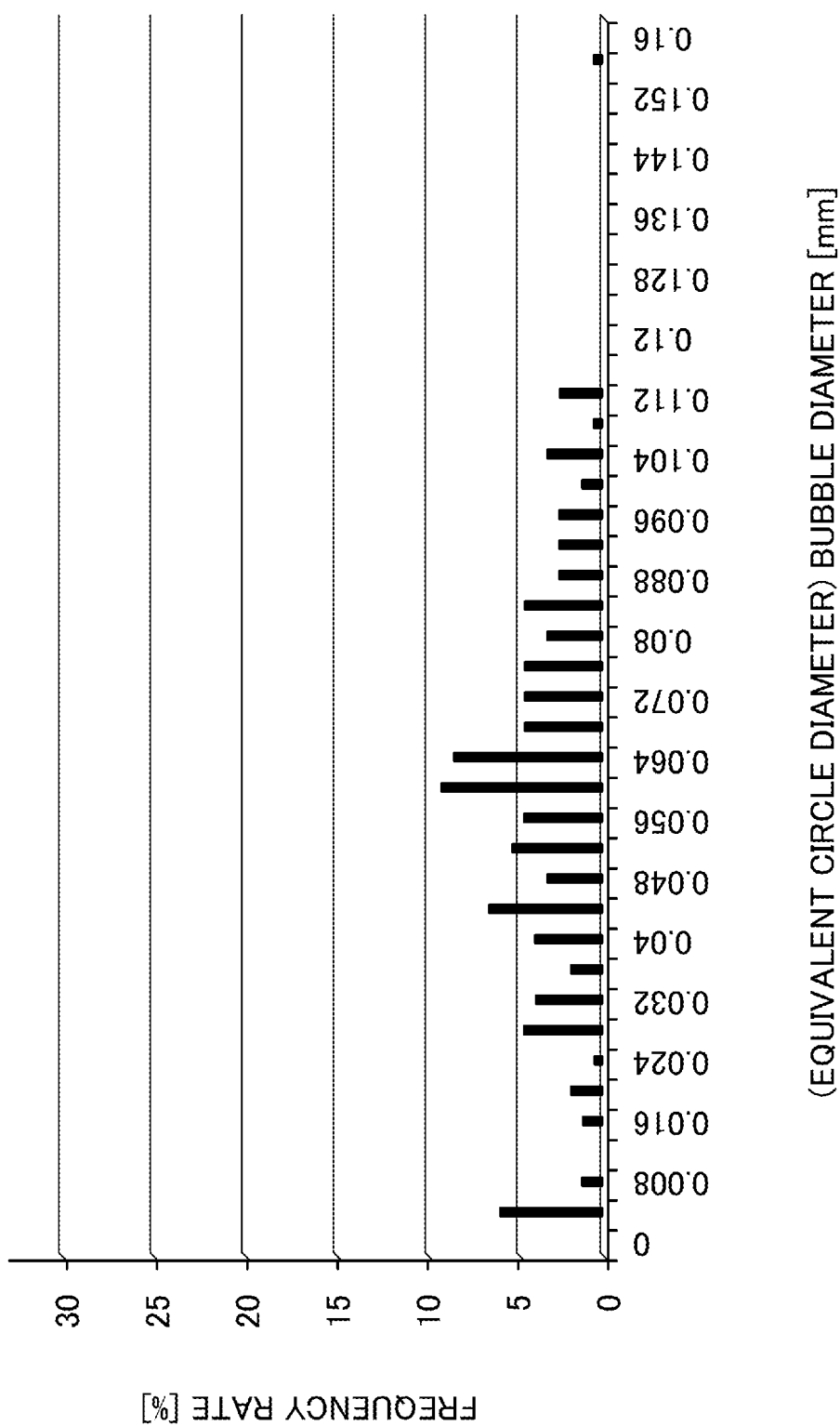
FIG. 4 is a drawing illustrating measurement results of bubbles measured by the bubble measurement device.

Next, an image of bubbles contained in the fresh water flowing along the image capturing surface was captured. Then, the obtained image was subjected to image processing and the bubbles were measured. FIG. 4 depicts the measured results. The sharp image of the bubbles was obtained, and thus, the bubble size distribution of microbubbles was able to be measured based on the obtained image.

Comparative Example 1

Comparative Example 1 was performed in the same manner as Example 1, except that the rotational speed of the roller of the tube pump was adjusted such that the flow velocity of the fresh water flowing along the image capturing surface of the measurement chamber was 300 mm/second.

However, an image of captured bubbles was blurred. A sharp image of the bubbles was not able to be obtained, and thus, the bubble size distribution of microbubbles was not able to be measured based on the obtained image.

Therefore, according to the Examples, it is confirmed that bubbles, including microbubbles, can be measured and the state of the bubbles can be appropriately grasped by adjusting the flow velocity of a fluid with respect to the image capturing device.

As described above, according to the bubble measurement device and the bubble measurement method, microbubbles can be securely measured by appropriately setting the flow velocity of a fluid in accordance with the capabilities of the image capturing device, thereby improving the performance of mineral processing.

According to an embodiment of the present disclosure, a sharp image of fine bubbles can be captured and the fine bubbles can be measured.

Although the embodiments of the present invention have been described in detail above, the present invention is not limited to the embodiments described above, and various modifications and substitutions can be made to the embodiments described above without departing from the scope of the invention.

What is claimed is:

1. A bubble measurement device for measurement of bubbles moving in a liquid, the bubble measurement device comprising:
    a measurement chamber into which the liquid containing the bubbles to be measured is introduced from below the measurement chamber, and having an image capturing surface at a position where the introduced bubbles rise;
    an image capturing device configured to capture an image of the bubbles passing along the image capturing surface;
    an introduction pipe provided below the measurement chamber and configured to introduce the bubbles into the measurement chamber;
    a retaining tank configured to store the liquid containing the bubbles to be introduced into the measurement chamber by the introduction pipe;
    a supply pump provided above the measurement chamber and configured to draw up the liquid containing the bubbles so as to supply the liquid into the measurement chamber;
    a drain pipe configured to return the liquid into the retaining tank after the liquid passes through the measurement chamber and the bubbles are measured; and
    a flow velocity adjusting mechanism configured to adjust a flow velocity of the liquid passing along the image capturing surface,
    wherein the flow velocity adjusting mechanism adjusts the flow velocity of the liquid passing along the image capturing surface to be within a range in which the bubbles are measurable, and
    the range is obtained in advance in accordance with an image resolution and a shutter speed of the image capturing device.

2. The bubble measurement device according to claim 1, wherein the flow velocity adjusting mechanism adjusts the flow velocity of the liquid by adjusting a discharge amount of the liquid from the supply pump.

3. The bubble measurement device according to claim 1, wherein the flow velocity adjusting mechanism adjusts the flow velocity of the liquid passing along the image capturing surface to be within a flow velocity range of 100 to 200 mm/second when the image resolution of the image capturing device is 1 μm, the shutter speed of the image capturing device is set to $1/2000$ seconds, and a minimum bubble diameter of the bubbles is 1 μm.

4. The bubble measurement device according to claim 1, further comprising:
    a storage configured to store a preliminarily-obtained flow velocity of the liquid, the bubbles being measurable at the preliminarily-obtained flow velocity of the liquid; and
    a controller configured to control the flow velocity adjusting mechanism in accordance with the preliminarily-obtained flow velocity of the liquid stored in the storage.

5. A bubble measurement method for measuring bubbles moving in a liquid, the bubble measurement method comprising:

a process of introducing the liquid containing the bubbles to be measured into a measurement chamber from a retaining tank disposed below the measurement chamber, the retaining tank storing the liquid containing the bubbles, and the measurement chamber having an image capturing surface;

a process of capturing, by an image capturing device, an image of the bubbles passing along the image capturing surface;

a process of measuring the bubbles based on the image captured by the image capturing device; and a process of returning the liquid into the retaining tank through a drain pipe after the liquid passes through the measurement chamber and the bubbles are measured, wherein the process of introducing the liquid containing the bubbles into the measurement chamber is performed in a state in which a flow velocity is adjusted to be within a range that is obtained in advance and in which the bubbles are measurable at an image resolution and a shutter speed of the image capturing device.

6. A bubble measurement device for measurement of bubbles moving in a liquid, the bubble measurement device comprising:

a measurement chamber into which the liquid containing the bubbles to be measured is introduced from below the measurement chamber, and having an image capturing surface at a position where the introduced bubbles rise;

an image capturing device configured to capture an image of the bubbles passing along the image capturing surface;

an introduction pipe provided below the measurement chamber and configured to introduce the bubbles into the measurement chamber;

a supply pump provided above the measurement chamber and configured to draw up the liquid containing the bubbles so as to supply the liquid into the measurement chamber; and a flow velocity adjusting mechanism configured to adjust a flow velocity of the liquid passing along the image capturing surface, wherein, based on a bubble size distribution, the flow velocity adjusting mechanism adjusts the flow velocity of the liquid passing along the image capturing surface to be within a range in which the bubbles are measurable, the range is obtained in advance in accordance with an image resolution and a shutter speed of the image capturing device, and the flow velocity is set to a flow velocity at which the bubbles do not adhere to the image capturing surface and the bubbles do not coalesce.

\* \* \* \* \*